United States Patent
Schäfer

(10) Patent No.: US 8,628,386 B2
(45) Date of Patent: Jan. 14, 2014

(54) CASING FOR FOODSTUFF

(75) Inventor: Ekkehardt Th. F. Schäfer, Karlsruhe (DE)

(73) Assignee: World Pac International AG, Schaanwald (LI)

( * ) Notice: Subject to any disclaimer, the term of this patent is extended or adjusted under 35 U.S.C. 154(b) by 183 days.

(21) Appl. No.: 13/248,723

(22) Filed: Sep. 29, 2011

(65) Prior Publication Data

US 2012/0082768 A1 Apr. 5, 2012

(30) Foreign Application Priority Data

Oct. 1, 2010 (DE) .......................... 10 2010 047 094

(51) Int. Cl.
*A22C 11/00* (2006.01)

(52) U.S. Cl.
USPC .......................................................... 452/32

(58) Field of Classification Search
USPC ........... 99/494, 450.6; 53/450, 451, 514, 516; 452/30–32, 35, 46, 51
See application file for complete search history.

(56) References Cited

U.S. PATENT DOCUMENTS

| | | | |
|---|---|---|---|
| 3,378,379 A | 4/1968 | Shiner et al. | |
| 4,248,912 A | 2/1981 | Gerigk et al. | |
| 4,357,371 A | 11/1982 | Heinrich et al. | |
| 5,992,345 A | 11/1999 | Lange et al. | |
| 6,326,039 B1 * | 12/2001 | Schiffmann et al. | 426/238 |
| 6,468,143 B1 * | 10/2002 | White et al. | 452/32 |
| 8,286,549 B2 * | 10/2012 | Auf Der Heide et al. | 99/450.7 |
| 8,353,742 B1 * | 1/2013 | Choi | 452/32 |
| 8,377,528 B2 * | 2/2013 | Kyle et al. | 428/35.2 |
| 8,443,752 B2 * | 5/2013 | Van Blokland | 118/13 |
| 2001/0008658 A1 | 7/2001 | Barmore et al. | |
| 2008/0226853 A1 | 9/2008 | Bueker et al. | |

FOREIGN PATENT DOCUMENTS

| | | |
|---|---|---|
| DE | 2512995 A1 | 10/1976 |
| DE | 3012250 B1 | 2/1982 |
| DE | 195 00 470 A1 | 7/1996 |
| DE | 19818358 A1 | 10/1999 |
| EP | 0037023 A1 | 10/1981 |
| EP | 1977650 A1 | 10/2008 |

OTHER PUBLICATIONS

Office Action issued Jul. 13, 2011 in DE Application No. 102010047094.5.
EP Search Report issued Jan. 17, 2012 in EP Application No. 11007707.0.

* cited by examiner

*Primary Examiner* — Richard Price, Jr.
(74) *Attorney, Agent, or Firm* — Panitch Schwarze Belisario & Nadel LLP

(57) ABSTRACT

A method for coating tubular food-casings (2), particularly skins with flavoring substances in particle form, includes wetting the casing (2) on the inside with adhesive, and then applying desired flavoring substances (6) onto the formed adhesive layer. The tubular casing (2), coated on the inside with adhesive, is guided through a first squeezing zone (5) and a second squeezing zone (8) in the travel direction, where the respective interior cross-sections of the tubular casing are temporarily closed. The second squeezing zone (8) is positioned higher than the first squeezing zone (5). The tubular casing is brought into the form of an inflated sack (2*b*) in between the two squeezing zones (5, 8) by a supply of particulate flavoring substances (6) and an air pocket (7) inserted into the interior of the tubular casing. During travel, the casing entrains the flavoring substances (6) from the supply.

21 Claims, 2 Drawing Sheets

CASING FOR FOODSTUFF

BACKGROUND OF THE INVENTION

The invention relates to a method and a device for coating tubular food casings, particularly skins, with flavoring substances in particle form, particularly spices, in which the tubular casing is wetted on the inside with an adhesive and the desired flavoring substances are applied to the formed adhesive layer.

Tubular sausage casings, which are coated on the inside with spice particles, have been suggested in DE 195 00 470. Here, one starts with a shined (gathered) sausage casing, which upon being pulled off into a cylindrical form is first wetted on the inside with a liquid adhesive. Subsequently, the sausage casing glides along an interior coating ring, whereby the adhesive should be more evenly distributed and wiped off to the desired thickness. During the further progression, via a central supply tube, pressurized air and spices are blown radially against the interior surface of the sausage casing, where it is held by the applied adhesive layer. Finally, the sausage casing must be dried.

In order to improve the adhesion of the spices, a rotating centrifugal disk can be provided at the end of the supply tube, which throws the spice by additional centrifugal force against the inside of the sausage casing.

In practice, this system has not proven successful, however, because no uniform and sufficiently thick coating with flavoring substances was ensured in the long run.

Instead, it is still common to produce tubular skins, to be coated with spices, first in the form of a flat foil and to coat it. Only thereafter is the coated flat foil then made tubular by matching shaping shoulders, forming it into a cylindrical form, and then closing it along its adjacent or overlapping longitudinal edges by sewing or adhesion.

This process is expensive with regard to time and energy, because the adhesive must be applied in a moist, liquid state upon the foil, with the consequence that after the application of the flavoring substances the foil must be subjected to an intensive drying process. Only after the drying can the flat foil coated with adhesive and spices then be brought into a tubular form and sealed by sewing, adhesion, or welding, and confectioned.

On the contrary, these processing steps would be impossible in a moist condition of the foil, both for hygienic as well as technical reasons.

BRIEF SUMMARY OF THE INVENTION

Proceeding from this prior art, the present invention is based on the object of developing a method for coating with flavoring substances, which are not dispersed in a carrier liquid but present in particle form, thus particularly spices, herbs, powdered fruity aromatics, and the like. Here, as the starting material, no flat foil shall be used but instead directly a tubular packaging foil, namely natural skins as well as mono- or multi-layered fibrous skins, artificial skins, and any other tubular textile casings. Furthermore, the packaging foil according to the invention shall be shirrable, so that it can be easily stored, transported, and particularly further processed with automatic fill and clip machines, without risking a local flaking off of the spices during the shining.

This object is achieved according to the invention in that the tubular casing coated on the inside with adhesive is guided through a first squeezing zone and a further squeezing zone downstream in the traveling direction, wherein the inner cross-section of the tubular packaging foil is temporarily closed, that the further squeezing zone is located higher than the first squeezing zone, that in the area between the two above-mentioned squeezing zones the tubular casing is brought into a form of an inflated sack by a supply of particulate flavoring substances and an air pocket introduced into the interior of the tube, and that the casing entrains flavoring substances on its interior coated with adhesive, when the casing is pulled through the supply of flavoring substances.

The invention is based on the knowledge that the weight of the flavoring particles filled into the inflated sack in combination with the air pocket located thereabove causes an intensive contacting thereof at the interior of the casing coated with an adhesive and that on the other side the compression of the casing occurring in the upper squeezing zone causes a stable connection between the adhesive layer and the flavoring substances. The casing according to the invention can thereby be coated with a higher density of flavoring substances and with greater reliability.

The sack principle for coating has indeed been known for more than 50 years for liquids. Thus, it is known from U.S. Pat. No. 2,901,358 to pre-treat a cellulose tube intended for sausage casings first with glycerin, so that it obtains a somewhat gel-like consistency, and then to fill the tube with a water-soluble chromium chloride solution as well as an air pocket between a lower and an upper squeezing zone. When the tube is then pulled through the two above-mentioned squeezing zones, it receives a coating on its interior with the chromium chloride solution. Downstream of the second squeezing zone the tube is again brought into an inflated state by an air pocket and dried by hot air at 100° C. to 110° C. to a residual moisture content of 4% to 6%, whereupon it is brought into a flat form and wound up onto a roller. This interior coating serves to allow the sausage casing to be later peeled more easily from the filled-in sausage. However, it was not obvious to modify this principle, such that a coating is made possible with particulate flavoring substances, which are not dispersed in a carrier liquid, but are instead present in dry form.

The air pocket, which is to be inserted above the flavoring substances into the sack and largely to be maintained while the casing is pulled through the squeezing zones, essentially has the purpose of keeping the flavoring substance spaced from the upper squeezing zone of the sack, so that no lumps from the supply of flavoring substances reach the upper squeezing zone, but only the particles adhering to the interior of the casing.

This air pocket preferably extends at least over ¼ of the height of the sack. It is beneficially always created when a new casing is threaded into the coating apparatus, namely concretely when the beginning of the casing passes the lower squeezing zone, but has not quite completely reached the upper squeezing zone. In this position of the casing, the supply of flavoring substance is first filled into the casing, namely preferably in such an amount that the entire casing leaving the supply roll can be coated with flavoring substances up to its end. Subsequently thereto, prior to threading the above-mentioned beginning section of the casing into the upper squeezing zone, it is ensured that above the supply of flavoring substances a sufficiently large pocket of support air remains, in order to space the supply of flavoring substances from the upper squeezing zone. This air pocket can be created in a simple manner by blowing in air.

Of course, it also lies within the scope of the invention to first create the air pocket in order to bring the casing into sack form and thereafter or simultaneously to fill in the supply of flavoring substances.

Alternatively, it is also within the scope of the invention to introduce the flavoring particles and the air pocket into the casing only after its beginning has already passed the upper squeezing zone. In this case, a hole is made in the casing beneath the upper squeezing zone, and through this hole the desired amounts are inserted. Then, the travel of the casing is switched on, so that the perforated area passes the upper squeezing zone and thus seals the inserted air pocket.

In order for the air pocket to maintain its functionality during the coating process, it is recommended to space the supply of flavoring substances from the upper squeezing zone, so that the casing comprises a possibly slightly air permeable or almost air tight material.

If the supply of flavoring substances and/or the air pocket runs short during the coating process, the travel of the casing through the squeezing zones can of course be interrupted at any time, an opening can be cut into the casing beneath the upper squeezing zone, and through this opening the flavoring particles and/or the support air can be refilled.

The desired application of the flavoring substances via the so-called sack principle only works if the casing first has adhesive properties at least on the inside. For this purpose, an adhesive substance is beneficially applied in a separate treatment step at least on the inside of the casing, that is, the application of the adhesive and the application of the flavoring substance takes place in separate stations, preferably directly following one another.

It lies here within the scope of the invention to add preservatives, particularly potassium sorbate or the like, together with the adhesive and/or the flavoring substances.

In order to wet the casing with a consumable adhesive, it is beneficially brought into a non-flat, open cross-sectional form, and the adhesive is applied from the center out to the inside of the casing. This is achieved particularly advantageously by applying the above-described sack principle, wherein the casing is brought into the form of a sack prior to coating with flavoring substances, in which an adhesive supply, beneficially with a support pocket of air, is filled in. The upper closure of this sack filled with adhesive can occur by the first squeezing zone of the sack filled with a flavoring substances or by an additional squeezing zone. In both cases it is recommended that the upper closure of the sack filled with adhesive be arranged above the adhesive supply.

The lower closure of the sack with the adhesive supply may be formed by a separate squeezing zone arranged upstream. In general, this squeezing zone may also be realized without any additional expense simply by the contact of the casing against its supply roll.

The adhesive supply should be filled into the sack at least in such an amount that it is sufficient for coating the entire casing, but at least for the entire flavoring substance supply.

Alternatively, the adhesive can also be applied from the outside onto the casing, namely when an absorbent casing is being processed, which then is optionally layered with one or more exterior layers, particularly a barrier layer, a layer preventing the formation of germs, or the like, particularly by coating. With such an application of the adhesive from the outside, the casing can remain in its flat cross-sectional shape, in which it is pulled off the supply roll.

Since the supply of flavoring substances continuously decreases during the coating process, and simultaneously a certain portion of the air pocket is exhaled via the upper squeezing zone, the volume of the inflated sack can be varied, particularly gradually reduced with the progressing coating. This may occur expediently in such a way that the distance between the two squeezing zones below and above the sack is reduced.

A beneficial further embodiment of the invention consists in providing not only one but several squeezing zones at the upper end of the sack. In this way, the sealing of the sack is improved, so that less air from the air pocket is entrained by the casing. In particular, the bonding of the casing with the flavoring substances entrained thereby is improved.

A particularly useful further embodiment of the invention consists in that the casing is brought into a shirred form, after its coating with flavoring substances, without a subsequent drying and/or heating. It is thereby optimally suited for further processing in the known automatic fill and double-clip machines of prior art.

Preferably, the shirring of the casing is combined with an automatic cutting to length, so that at the end of the coating process, one obtains shirred partial sections of commercial length.

The omission of the otherwise customary heating and drying of the casing is possible according to the invention, because the high humidity of the casing developed by the adhesive coating process is drastically reduced by the application of dust-dry flavoring particles occurring immediately thereafter, and because a sufficient amount of preservatives is mixed with the adhesive.

As a result, one thus obtains a finished casing, which has a moisture content ranging from approximately 10%, maximally 20%, with its adhesive and the flavoring substances. The casing is then not subject to any significant risk of germ formation, in particular after the coating with flavoring substances it can be directly further processed, particularly wound up or shirred, without any interim drying.

Different possibilities offer themselves to the person skilled in the art for construction of the squeezing zones. Thus, the squeezing zones may be created, for example, by funnel-like constrictions of the tubular casing, perhaps combined with a twisting. However, it is particularly advantageous to create the squeezing zone by squeeze rolls, where the tubular packaging foil is forced into a flat shape, where the walls of the tubular packaging foil are thus brought into tight contact with each other. A particularly reliable sealing in the upper squeezing zone is thereby created, such that the packaging foil is not only brought into a flat form by one squeeze roll, but that two squeeze rolls are arranged parallel next to each other, which have no or only a minimal gap for the casing to pass through, so that the deformation of the inflated sack into the flat shape is combined with an additional compression of the two tube layers lying on top of each other. In this way, one achieves a particularly effective embedding of the powdered flavoring substance in the adhesive layer of the casing.

In order for the compression to be ensured without any local damage to the relatively thin casing, the squeeze rolls preferably have a rubber-elastic exterior jacket, for example made of foam rubber or the like.

Additionally, the compressive effect between the tube layers can be increased even more by the squeeze rolls having ribs extending in the axial direction on their exterior jacket, thus having a slight exterior toothing, wherein the ribs of adjacent rolls comb with each other, thus engaging in one another.

If a particularly thick coating of the casing with flavoring substances is desired, a further embodiment of the inventive concept offers the possibility of loading the flavoring substance not only by the own weight of the normal fill amount, but instead by inserting a greater supply of flavoring substances than required for the entire casing. Additionally, the pressure on the flavoring substances can be further increased in that the supply of flavoring substances is loaded by placing a relatively heavy pressure plate thereon. This pressure plate can have a cross-sectional area which is only slightly smaller than the cross-sectional area of the inflated sack, so that the flavoring substances located underneath are loaded not only by their own weight, but by a considerably higher additional weight, and thus pressed against the interior of the casing.

Tests with the method according to the invention have surprisingly shown that the spices should have a smaller particle size than was previously common. Preferably, spices of a particle size corresponding to 8 Mesh to 400 Mesh, particularly corresponding to 30 Mesh to 50 Mesh are therefore used.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
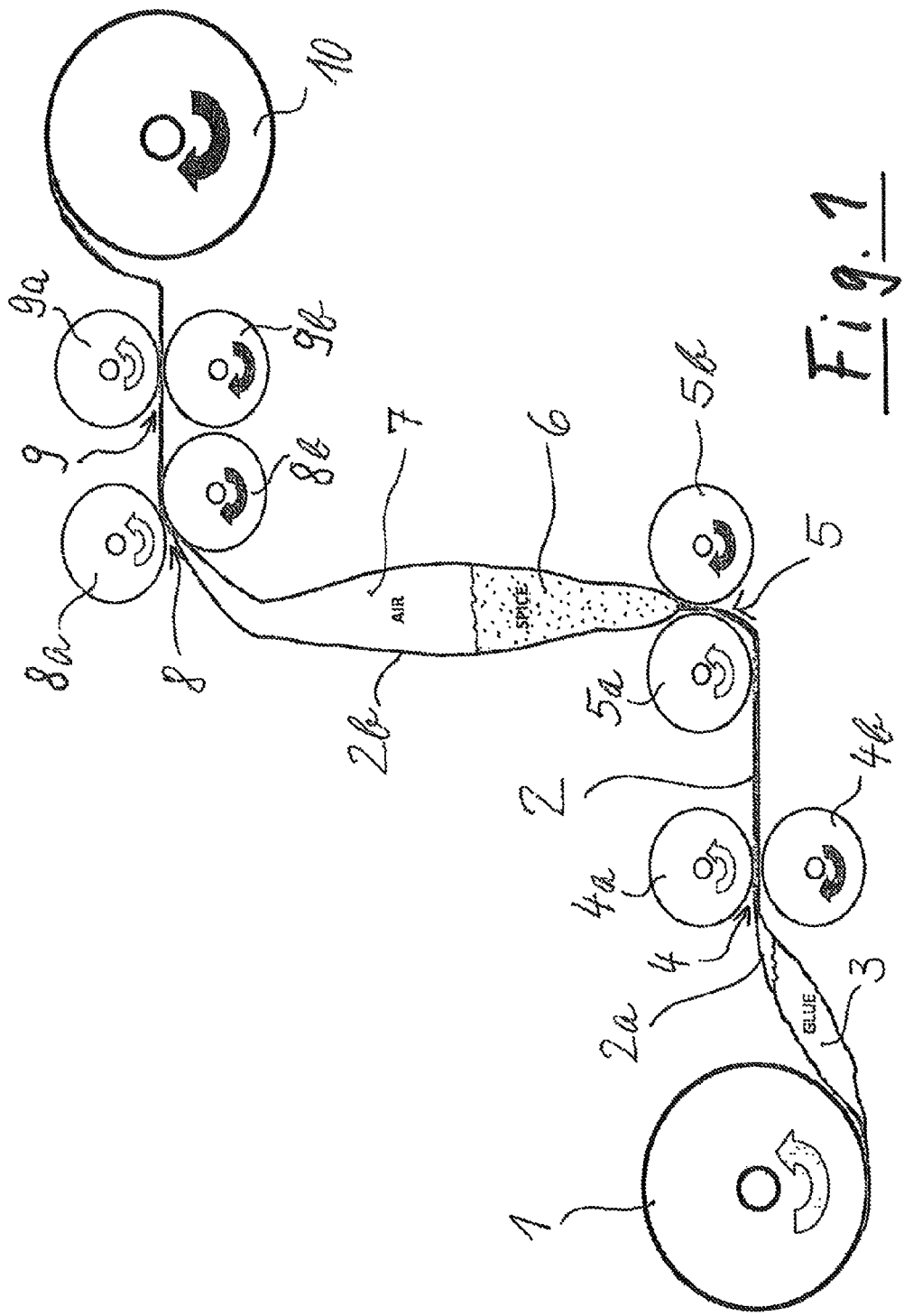
FIG. 1 is a schematic illustration of one embodiment of complete coating process according to the present invention, wherein the finished, coated casing is rolled up at the end.

The process starts from a supply roll 1, on which the tubular casing 2 is wound up in a flat form. The supply roll 1 can accept, for example, a casing which is 40 m to 500 m long.

Sleeves made from most different materials may be considered as the casing. For example, it may involve fibrous skins reinforced with viscose, or collagen skins or dried natural skins, as well as coated textile skins, synthetic skins coated with collagen, carrageenan, or acrylate, or other mono- or multi-layered sleeves, which do not have excessive air permeability.

At the start the casing 2, which presents itself as an open tube end, is filled with a liquid adhesive 3, which is approved for use with food and known per se, and perhaps also support air, so that the casing assumes the shape of a sack 2a, which is partially or entirely filled with the adhesive 3. The amount of adhesive is measured such that the entire casing wound up on the supply roll 1 can be coated with the adhesive. The casing 2 is supplied in dry form to the adhesive, so that it can be easily taken up. If the casing is poorly wettable with the adhesive, it can optionally have an absorbent interior layer.

Simultaneously, a powdered or liquid preservative, particularly based on potassium sorbate, can be filled into the sack 2a, so that the casing is protected from germ formation, in spite of the high moisture content. Alternatively or additionally, this preservative can also be added later together with the flavoring substances.

Particularly starch, casein, collagen, carrageenan, alginate, and the like are suitable as adhesives, each in a low-viscosity solution, in order to ensure good wetting abilities.

In the embodiments shown, the bottom end of the sack 2a filled with the adhesive is formed by its tight contact with the supply roll 1 closing the sack. Instead, a squeezing zone could also be arranged here in the form of squeeze rolls or the like.

Subsequently, the casing arrives between two squeeze rolls 4a and 4b. These squeeze rolls press the packaging foil into a flat form and by their squeezing force define the amount of adhesive that can be entrained by the casing on its interior while passing the two squeeze rolls.

Then, the casing reaches a squeezing zone 5, formed by two squeeze rolls 5a and 5b, and after passing them the casing reassumes the form of a sack, which ascends upwardly, namely beneficially approximately perpendicularly upwardly, and which is designated by the reference numeral 2b. This sack is filled in its lower region with dust-dry flavoring particles 6, particularly spices of 30 Mesh to 50 Mesh, thus a grain size of approximately 0.3 mm to 0.6 mm. With regard to its pressing against the walls of the casing, which are held flat and lying in contact with each other, the squeezing zone 5 is constructed such that the flavoring substances 6 cannot slide downwardly out of the sack 2b.

In the upper section of the sack there is an air pocket 7. This air pocket 7 essentially has the object of spacing the spices 6 from the upper end of the sack, which is formed by another squeezing zone 8 in the form of two squeeze rolls 8a and 8b, so that only those spice particles can pass the gap between the squeeze rolls 8a and 8b that adhere to the interior wall of the casing 2, thus no lumps of spices from the supply 6 can be seized by the squeeze rolls and be further transported.

The squeeze rolls have an essentially greater diameter than conventional guide rolls. This, in combination with their rubber elastic exterior jacket, leads to bands developing several centimeters wider in the transport direction of the packaging foil, where the casing is being compressed.

The insertion of the spices 6 as well as the air pocket 7 occurs during threading of a new casing, before the beginning of the casing reaches the squeezing zone 8. After passing the squeeze rolls 8a and 8b, a seal of the sack 2b develops and simultaneously the spice particles entrained upwards by the casing are pressed by the squeeze rolls 8a and 8b against the interior wall of the casing, so that they adhere well during the further processing and do not fall off.

The distance between the lower squeezing zone 5 and the upper squeezing zone 8 is beneficially adjustable, particularly such that the squeeze rolls of the upper squeezing zone 8 can travel downwardly, in order to compensate for the decreasing volume of the sack 2b during the coating process. In this way it is ensured that the casing maintains a firm sack form, even when the sack itself becomes shorter and shorter with increasing coating, because the squeezing zones 5 and 8 approach each other.

Beneficially, another squeezing zone 9 follows directly behind the squeezing zone 8, which is formed by the squeeze rolls 9a and 9b. The zone 9 intensifies the bonding between the casing and the entrained spices and improves the sealing relative to the air pocket 7.

Finally, the finished coated casing reaches a windup roll 10, optionally via additional guide rolls.

As soon as the casing is threaded through all squeeze rolls and thereby filled with adhesive 3, spices 6, and air pocket 7, and is fastened to the windup roll 10, it travels continuously from the supply roll 1 to the windup roll 10 and is thereby coated. The travel of the casing occurs beneficially by the squeeze rolls themselves. In general, it is sufficient if only one of two mutually corresponding squeeze rolls is driven, in the embodiment it is each of the squeeze rolls having the darkened arrow showing the rotation direction.

An interim drying of the casing can be dispensed with, because by the appropriate processing the moisture content after the coating with spices is maintained at approximately 10% to maximally approximately 20%.

Preferably, in all squeezing zones one of the two squeeze rolls is adjustable relative to its spacing from the neighboring squeeze roll, in order to facilitate the threading of the casing 2.

The described casing 2 can be made of almost any desired material, mono- or multi-layered, optionally even with a rough or absorbent interior layer and/or with coatings and/or laminates, particularly in order to render the sleeve largely impermeable to water vapor and/or oxygen.

In the embodiment shown the coated casing 2 is fed to a windup roll 10 in a flat form. Instead, it is also possible to shirr the casing online.

Figure 2:
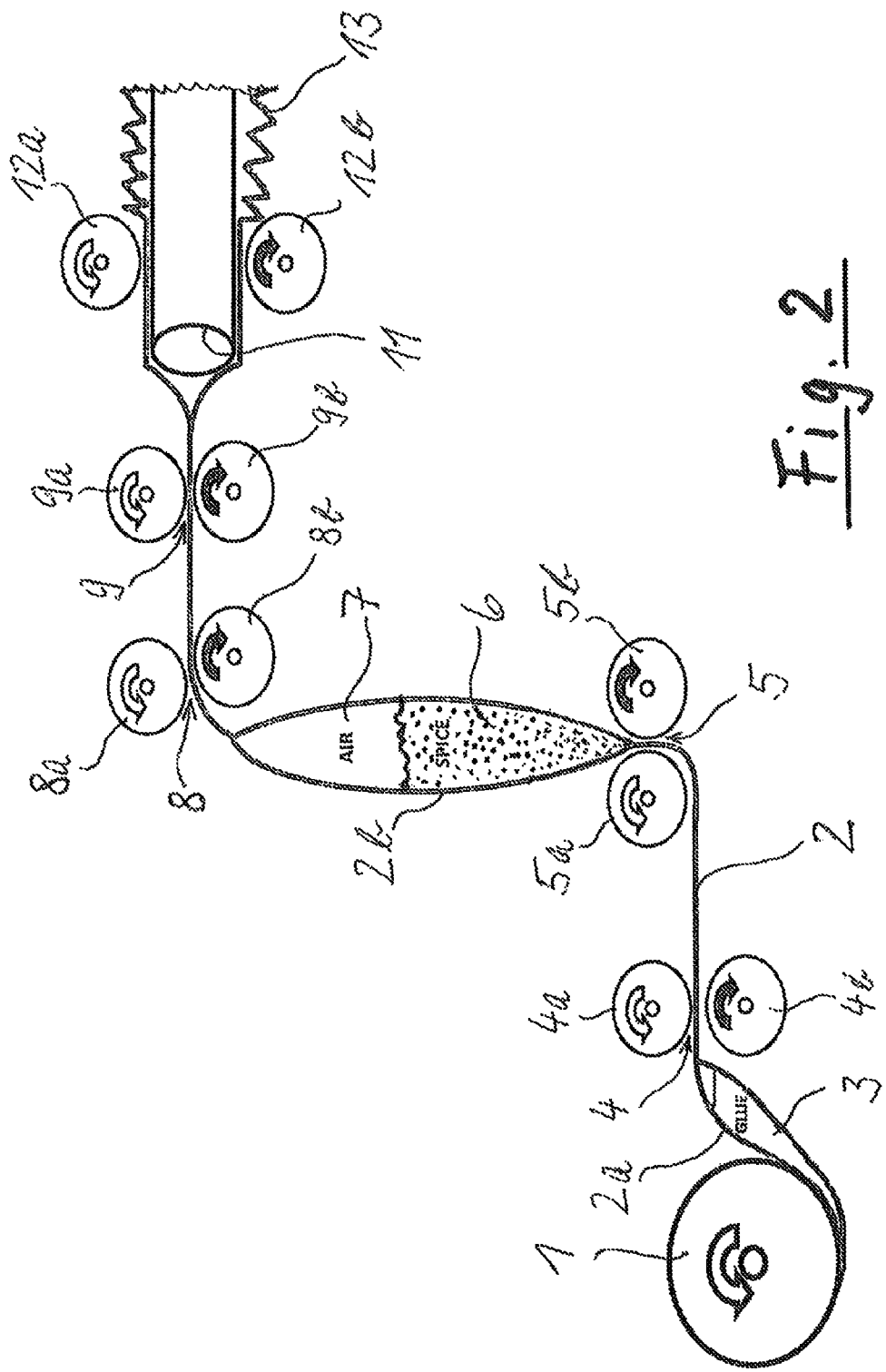
FIG. 2 is an illustration, similar as FIG. 1, of a second embodiment of the complete coating process according to the invention, but wherein the casing is directly shined at the end.

This particularly preferred variant is shown in FIG. 2. For this purpose, the finished coated casing 2 is here fed axially onto a cylindrical shining tube 11, namely via several shirring rolls distributed over the circumference, of which two shining rolls 12a and 12b are visible. After passing these shirring rolls, approximately 5 m to approximately 50 m long sections of the casing are formed by an axial crimping into harmonica-like shined strands 13, which are particularly preferred by the meat product and cheese industries.

The shining process itself is known per se, and thus it is not described further in detail. However, it is essential that the shining process occur directly subsequent to the interior coating of the casing with spice particles, without the casing requiring a heating and/or drying. This results in a considerable energy saving.

Using the above-described technology, tubular casings can for the first time be provided as the starting material for an interior coating with spices, so that the previously required sewing or adhesion along the longitudinal sides of the cylindrical foils is omitted. Additionally, the casings according to the invention can be brought into a shined form without the risk of edge breaks and be economically processed on the known automatic fill and double-clip machines. They are suitable for the most different foods, particularly meat, sausage, fish, or cheese.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for coating a tubular food casing (2), particularly a skin with flavoring substances in particle form, particularly spices, the method comprising wetting the tubular casing (2) on its inside with an adhesive (3) and applying a desired flavoring substance (6) onto the adhesive wetting, wherein the tubular casing (2), wetted on its inside with an adhesive, is guided through a first squeezing zone (5) and a second squeezing zone (8) following the first squeezing zone in a travel direction of the tubular casing, where an interior cross-section of the tubular casing is temporarily closed, wherein the second squeezing zone (8) is positioned higher than the first squeezing zone (5), wherein the tubular casing is brought into a form of an inflated sack (2b) in a region between the two squeezing zones (5, 8) by a supply of particulate flavoring substances (6) and an air pocket (7) inserted into an interior of the tubular casing, and wherein during its travel the tubular casing entrains the flavoring substances (6) from the supply on its inside wetted with adhesive.

2. The method according to claim 1, wherein the wetting with the adhesive (3) and the applying of the flavoring substance (6) occur in separate stations.

3. The method according to claim 1, wherein the tubular casing (2) is impregnated with a preservative, optionally simultaneously with the wetting with the adhesive (3).

4. The method according to claim 1, wherein the preservative comprises potassium sorbate.

5. The method according to claim 1, wherein the tubular casing (2) is brought into a non-flat, open cross-sectional form for the wetting with adhesive, and the adhesive is applied from the center out to the inside of the tubular casing.

6. The method according to claim 5, wherein the wetting of the tubular casing (2) with adhesive (3) occurs before the first squeezing zone (5), and wherein before the first squeezing zone the tubular casing is brought into a shape of a first sack (2a), into which a supply of adhesive (3) is filled.

7. The method according to claim 6, wherein an upper closing of the first sack (2a) occurs via the first squeezing zone (5) or via an additional squeezing zone (4).

8. The method according to claim 7, wherein a position of at least one of the squeezing zones (4, 5, 8) is adjustable in a longitudinal direction of the tubular casing (2).

9. The method according to claim 7, wherein each of the squeezing zones (4, 5, 8) is created by funnel-shaped constrictions of the tubular casing (2).

10. The method according to claim 7, wherein each of the squeezing zones (4, 5, 8) is created by opposing rolls (4a, 4b; 5a, 5b; 8a, 8b), where the tubular casing (2) is subjected to compression.

11. The method according to claim 6, wherein an upper squeezing zone (4) is arranged above the supply of adhesive (3) for closing the first sack (2a).

12. The method according to claim 6, wherein the supply of adhesive is filled into the sack (2a) at least in such an amount sufficient for wetting the entire tubular casing (2).

13. The method according to claim 6, wherein a volume of at least one of the first and second sacks (2a, 2b) is adjustable.

14. The method according to claim 13, wherein a volume of at least one of the first and second sacks (2a, 2b) is gradually reduced during progression of the coating method.

15. The method according to claim 1, wherein the tubular casing (2) is absorbent, and wherein the absorbent tubular casing is saturated from the outside with an adhesive and then coated with at least one exterior layer, optionally a barrier layer or an anti-germ coating.

16. The method according to claim 1, wherein the supply of particulate flavoring substances (6) comprises particles having a particle size corresponding to 8 Mesh to 400 Mesh, optionally approximately 30 Mesh to approximately 50 Mesh.

17. The method according to claim 1, wherein the supply of particulate flavoring substances (6) filled into the sack (2b) is additionally loaded by a weight.

18. The method according to claim 17, wherein the weight has an outer diameter almost corresponding to a maximum inner diameter of the sack (2b).

19. The method according to claim 1, wherein the tubular casing (2) is pulled off a supply roll (1) in flat wound up form, and wherein after wetting with the adhesive (3) the tubular casing is fed directly to the supply of particulate flavoring substances, optionally without drying.

20. The method according to claim 1, wherein the tubular casing (2) after the application of the flavoring substances (6) and without intermediate drying is brought into a shirred form.

21. The method according to claim 20, wherein the tubular casing (2) is further separated into shined partial sections comprising shined strands (13) of commercial length.

* * * * *